April 23, 1957   J. M. BREESE ET AL   2,789,590
DISPENSING APPARATUS
Filed May 13, 1955
4 Sheets-Sheet 2
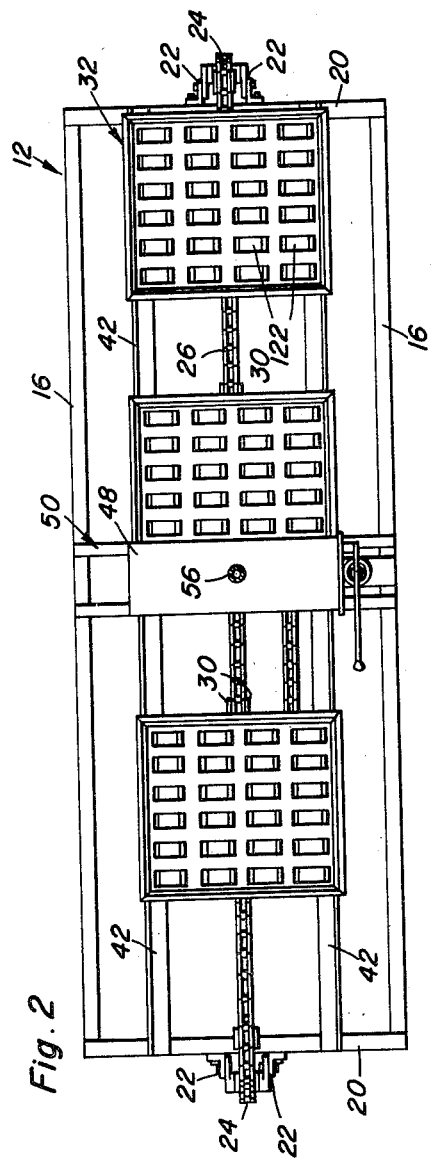
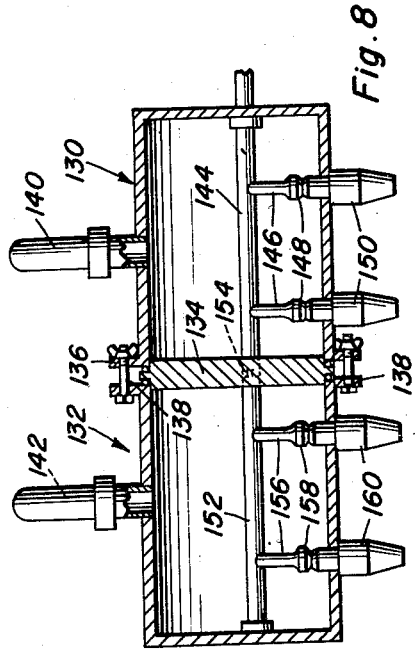
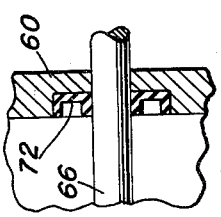
John M. Breese
William R. Weaver
INVENTOR.
BY Clarence A. O'Brien
and Harvey B. Jacobson
Attorneys April 23, 1957    J. M. BREESE ET AL    2,789,590
DISPENSING APPARATUS
Filed May 13, 1955    4 Sheets-Sheet 3
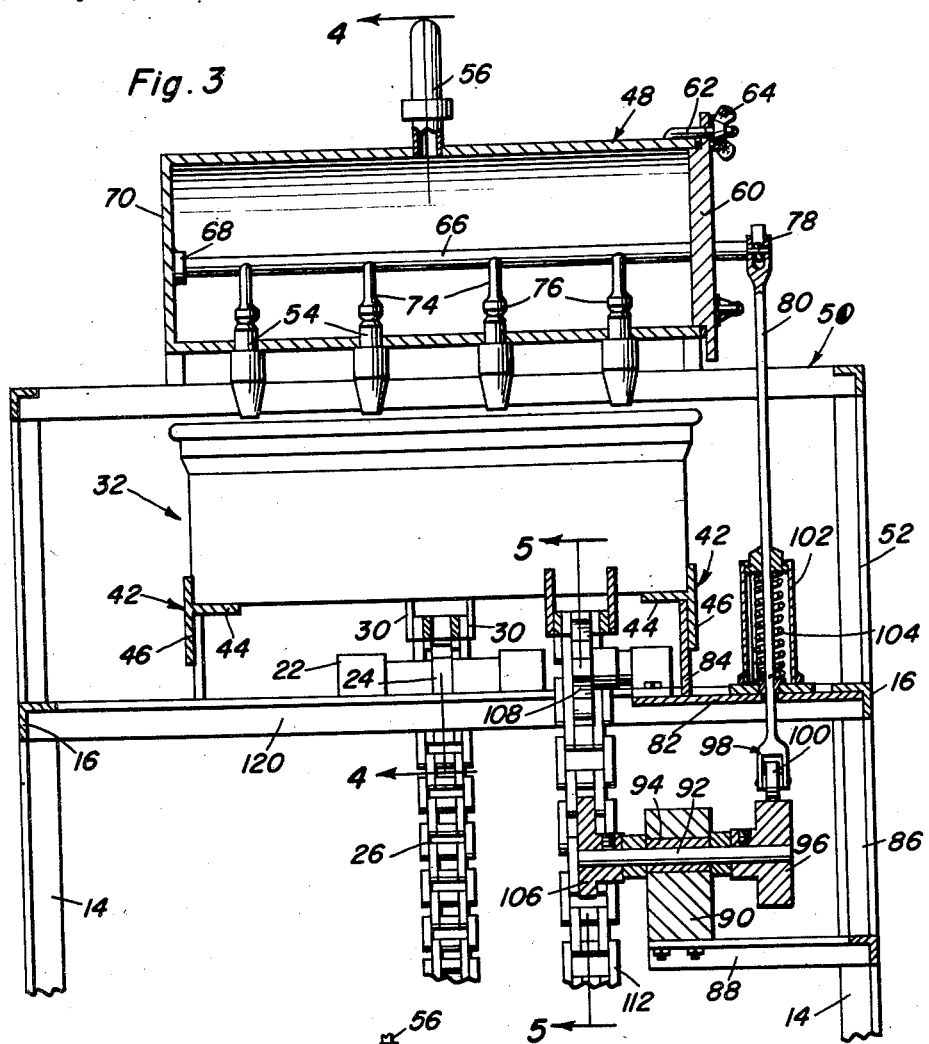
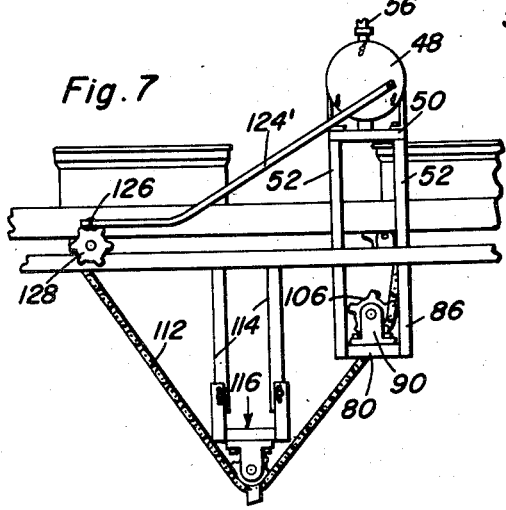
John M. Breese
William R. Weaver
INVENTOR.

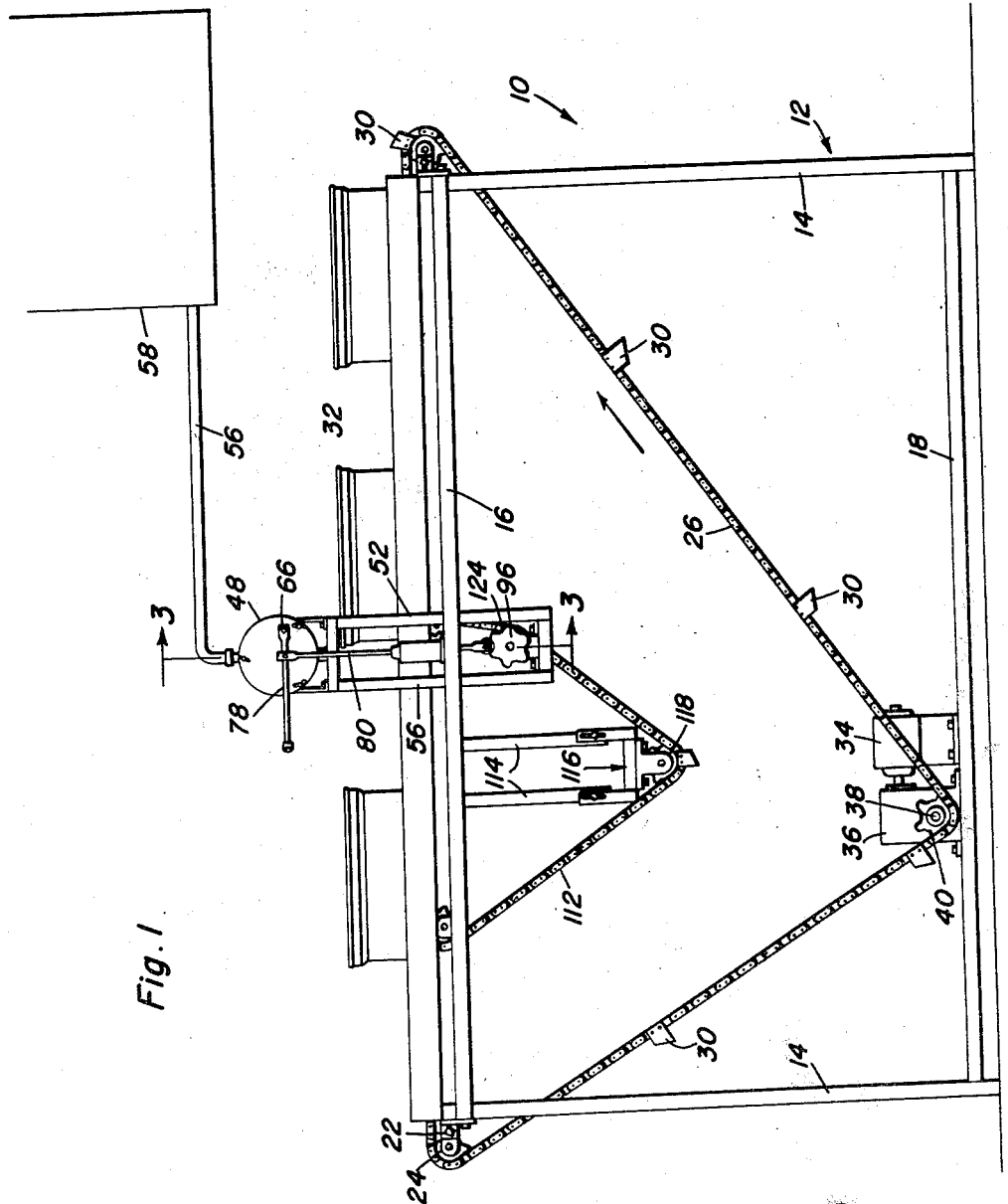

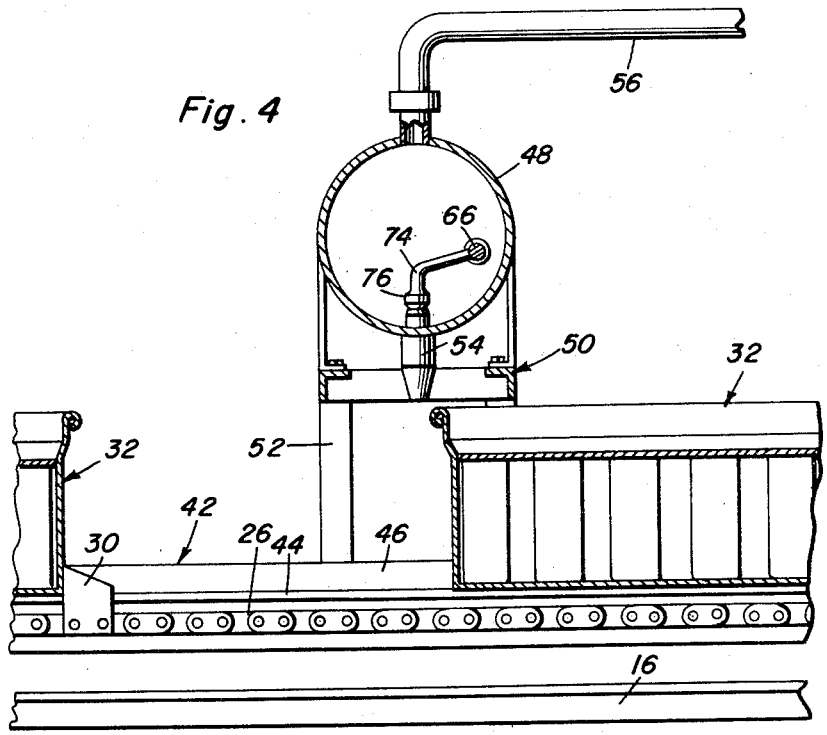
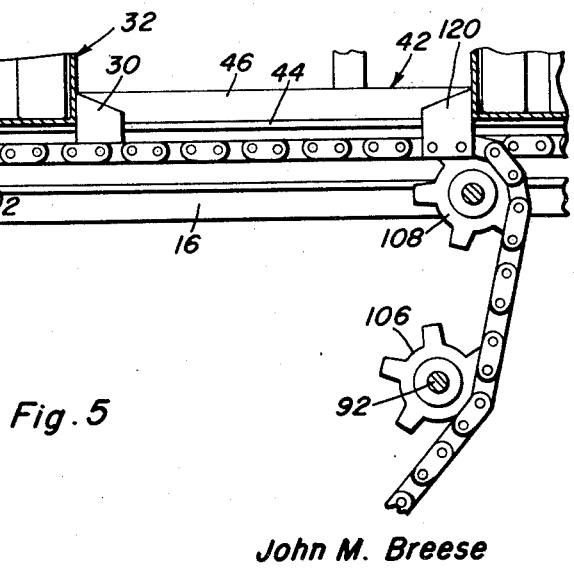

2,789,590

DISPENSING APPARATUS

John M. Breese and William R. Weaver, El Paso, Tex.

Application May 13, 1955, Serial No. 508,064

2 Claims. (Cl. 141—159)

The present invention relates to a dispensing apparatus, and more partciularly relates to an apparatus for dispensing liquids or other materials in discrete amounts at controlled intervals.

Basically, the apparatus constituting the present invention was developed for the dispensnig of liquid in the manufacture of frozen confections such as "popsickles" and the like. Customarily and prior to the present invention, these frozen confections were formed in molds, the molds taking the form of compartmented receptacles, the liquid being manually dispensed into the molds.

Primarily, this invention is in the provision of a dispensing machine which will fill the mold cavities of the frozen confection receptacles rapidly and accurately in accordance with the movement of the mold receptacles underneath the supply reservoir from which the liquid is dispensed.

A highly important object of the invention, ancillary to the primary object, is in the provision of a liquid dispensing machine for filling individual mold cavities of continuously moving receptacles without the necessity of stopping the receptacles or requiring an operator to open and close the valve means to the supply reservoir.

A further object of the invention is in the provision of a dispensing machine for dispensing liquid in discrete amounts wherein the liquid is dispensed only in response to movement of a receptacle beneath the supply reservoir, the opening and closing movement of the valve means controlling the dispensing of liquid from the supply reservoir being rendered operable only through the positive movement of a receptacle beneath the supply reservoir and being dependent upon no particular spacing of receptacles with respect to one another or speed of movement of receptacles with respect to one another.

A further object of the invention is in the provision of a liquid dispensing apparatus in which a plurality of mold receptacles are linearly advanced and positively and continuously advanced through the apparatus by conveyor means beneath the liquid supply reservoir, the valves into the supply reservoir to dispense the liquid therefrom opening and closing in timed relation to the passage of the individual cavities of the advancing mold beneath the supply reservoir or liquid dispenser.

A further object of the invention is in the provision of a novel valve operating means includnig an endless conveyor operating in conjunction with and on a plane with the receptacle conveyor to operate a cam wheel which in turn operates a cam lever to open and close the valve means to the liquid dispenser in response to movement of a mold receptacle beneath the dispenser.

A final object of the invention to be mentioned specifically is in the provsion of means for successively dispensing two or more flavors into each mold receptacle, one flavor going into some of the cavities of the receptacle and the second flavor entering the other cavities of the receptacle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the liquid dispensing apparatus constituting the present invention;

Figure 2 is a top view of the liquid dispensing apparatus constituting the invention;

Figure 3 is an enlarged, cross-sectional view taken through a portion of the apparatus substantially along the plane of section line 3—3 of Figure 1;

Figure 4 is an enlarged cross-sectional view taken substantially along the plane of section line 4—4 of Figure 3;

Figure 5 is a cross-sectional view taken substantially along the plane of section line 5—5 of Figure 3;

Figure 6 is an enlarged detail view in cross-section of the journaling of the valve operating rod through the end wall of the liquid dispenser or secondary supply reservoir;

Figure 7 is a side elevational view of a modified form of valve operating means for the apparatus; and Figure 8 is a longitudinal cross-sectional view through a liquid dispenser utilized to dispense more than one flavor in each operation thereof.

Referring now to the accompanying drawings in detail, there is disclosed in Figure 1 a liquid dispensing apparatus designated in its entirety by the numeral 10. The apparatus consists primarily of a rectangular skeleton frame 12 including end legs 14, longitudinal top members 16, longitudinal bottom members 18, top end cross members 20 (Figure 2), and bottom end cross members, not shown.

As will be particularly noted in Figure 2, the top end cross-members 20 are provided intermediate their ends with mounting brackets 22 which journal sprockets 24 therebetween. Conveyor means in the form of an endless chain 26 is entrained over the idler sprockets 24 and extends linearly between the idler sprockets 24 to form a generally longitudinal, planar run.

The chain 26, noting particularly Figure 1, is seen to include a plurality of cleats or lugs 30 projecting perpendicularly therefrom to engage molds or mold receptacles 32 as they are moved longitudinally along the top of the frame 12 in response to movement of the top run of the conveyor means 26 therealong.

To move the endless conveyor means 26, the frame 12 has mounted between the longitudinal rails 18 on suitable supports a prime mover, which may be an electric motor or the like 34 coupled to a speed reducer or transmission 36 which in turn has a driving shaft 38 extending therefrom transversely of the housing, which driving shaft carries a driving sprocket 40 engaging the endless chain 26 to move the same in response to rotation of the drive shaft 38.

Mounted on the top of the frame 12 and spaced slightly thereabove are a pair of spaced, parallel guide rails 42 which flank the top run of the endless chain 26. As will be noted particularly from Figure 3, the guide rails 42 are generally T-shaped in cross-section including flat stems 44 and vertical cross-heads 46. The molds or receptacles 32 are disposed so that they ride on the flat stems 44 of the guide rails 42 with their side edges being retained between the guide rails 42 by engagement with the vertically extending cross-heads 46. Obviously, angle iron members could be utilized in place of the T-shaped members or other suitable guide rail elements could be utilized. The primary purpose of the guide rails 42 is to space the molds 32 above the top run of the endless chain 26 whereby they will not interfere with the operation of the endless chain and will be engaged by the perpendicularly extending lugs 30 of such endless chain whereby they will be moved longitudinally along the frame 12.

Midway between the ends 20 of the frame 12 and suspended above the top of the conveyor means formed by the endless chain 26 and the guide rails 42 is a liquid supply reservoir or dispenser 48. The dispenser 48 is composed essentially of a cylindrical drum extending transversely across the top of the frame 12 of the apparatus 10 being mounted on a rectangular platform 50 which is suspended above the top of the frame 12 by the supporting standards 52.

Spaced longitudinally along the bottom of the drum 48 are a plurality of dispensing nozzles 54. These nozzles open above the top run of the conveyor means 26, 42 and permit liquid to flow from the supply reservoir into the molds 32 as these molds are moved along the frame 12. Supply pipe 56 opens into the top of the reservoir 48 and connects the main supply reservoir 58, a portion of which is shown in Figure 1.

The reservoir 48 has one end wall 60 thereof removably attached thereto by means of the J-bolts 62 and tightening butterfly nuts 64, the end wall being removable for ease of cleaning. Rotatably journaled through the end wall 60 and being offset to one side of the axis of the drum 48 is a valve operating rod 66, one end of which is journaled rotatably in the boss 68 mounted on the inner surface of the fixed end wall 70 of the liquid dispenser 48, the other end thereof projecting outwardly through the movable end wall 60.

To sealingly, rotatably journal the valve operating rod 66 through the removable end wall 60, the removable end wall 60 is provided with a recess therein receiving a suitable sealing bearing engaging the rod 66. This construction may be most clearly observed in Figure 6.

Spaced along the rod 66 within the liquid dispensing drum 48 are a plurality of forwardly projecting arms 74 terminating at their free ends in valve 76 normally closing the nozzles 54.

To open and close the valves 76, the shaft 66 is oscillated, and to provide this oscillation, the exteriorly projecting end of this shaft is attached to one end of a longitudinally extending lever 78, an intermediate portion of which is pivotally connected to the upper end of a vertically extending push rod 80, as may most clearly be observed in Figures 1 and 3.

Platform bracket 82 extends between one top side rail 16 and the adjacent guide rail 42, being connected to the latter mentioned member by a suitable strap 84.

Disposed below platform 82 and suspended from the top side rail 16 by means of straps 86 is a cantilever bracket 88 to the inner end of which is attached an upstanding journal bearing 90 rotatably journaling the shaft 92 therethrough through bushing 94. To the end of the shaft 92 disposed between the journal bearing 90 and the suspension straps 86 of the cantilever bracket 88 is a cam wheel 96. Push-rod 80 projects loosely slidably through the platform 82 and has journaled between the furcations of its bifurcated lower end 98 a roller 100 which engages the cam wheel 96.

To assure the engagement of the roller 100 with the cam wheel 96, an upstanding housing 102 is provided on the platform 82 in surrounding relation to the push-rod 80 and a coil spring 104 is disposed within the housing, the lower end of the spring being fixedly attached to the push-rod 80 and the upper end of the spring reacting against the top of the housing 102 thereby urging the lower end 98 of the push-rod 80 toward the cam wheel 96 at all times.

To the opposite end of the shaft 92 is connected a sprocket 106. Spaced above the sprocket 106 and journaled at opposite ends of the platform 82 are further sprockets 108 and 110, respectively, between which sprockets extends a portion of an endless chain 112. The portion of the chain 112 extending between sprockets 108 and 110 is disposed parallel to the top run of the conveyor 26 and forms, in effect, the top run of the endless chain 112.

Suspended from straps 114 adjustably by means of the yoke 116 between and below sprockets 106, 108 and 110 is a sprocket 118 over which another portion of the endless chain 112 is entrained.

The endless chain 112, like the chain 26, has upstanding cleats or lugs 120 projecting perpendicularly therefrom. The top run of the chain 112 is parallel and on the same plane with the top run of the chain 26 whereby cleats or lugs 120 extend upwardly for engagement by the molds 32 in the same manner as do the cleats or lugs 30 of the chain 26. Consequently, chain 112 is moved by engagement with the forward ends of the molds 32 with the lugs 120, upon which engagement, the chain 112 moves, turning the sprocket 106 which in consequence turns the cam wheel 96, thereby moving the push-rod 80 and opening and closing the valves 76 to release fluid from the nozzles 54 into the mold cavities 122 of the molds 32, as the ears 124 of the cam wheel 96 open the valves.

As thus far described, the operation of the device is exceedingly effective and yet exceedingly simple. As the receptacles 32 are moved along the top of the frame 12 by the conveyor chain 26, they come in contact with the lugs 120 of the endless chain 112, the contact of each mold with the lugs 120 causing the cam wheel 96 to move and thus reciprocating the push-rod 80 and oscillating the shaft 66 whereby the valves 76 open and close in response to the position of the ears 124 of the cam wheel 96 with respect to the roller 100 and the lower end of the push-rod 80.

As will be noted in the set-up shown in the drawings, each of the molds 32 is provided with six longitudinally spaced rows of mold cavities 122, each longitudinal row of mold cavities 122 consisting of four transversely spaced mold cavities. Noting for the moment the reservoir 48, it will be seen that there are four transversely spaced nozzles 54 and a like number of valves 76. Now noting cam wheel 96, it will be noted that the cam wheel possesses six ears 124, the length of movement of the top run of the chain 112 being equal to the length of the mold 32 whereby each of the mold cavities 122 will be filled as the mold 32 moves under the dispenser 48, the liquid being stopped as the mold 32 moves out from under the dispenser 48.

Obviously, many variations may be utilized with respect to the valve operating means, and in place of the push-rod 80 being connected to the longitudinally extending lever 78 as shown in Figure 3, the construction of Figure 7 may be utilized wherein a diagonally extending lever 124 is connected to the projecting end of the valve operating rod 66, the lever 124' being provided at its free end with a roller 126 in engagement with a cam wheel 128 which is operatively connected for rotation with the idler wheel 110 previously mentioned although not shown in Figure 7.

For a liquid dispenser to be modified to dispense more than one flavor, a construction such as that of Figure 8 may be utilized wherein the dispenser consists basically of two cylindrical drums 130 and 132 sharing a common end wall 134 and being attached to one another and to the common end wall 134 by means of flanges 136 and 138, respectively, connected to one another by means of the fastening element 138.

Supply pipes 140 and 142 open into the respective drums 130 and 132 or into the respective halves of the liquid dispenser if it is desired to consider the common end wall 134 as a partition between the drums 130 and 132. Valve operating rod 144 extending eccentrically into the drum 130 and in a line parallel to the axis thereof has arms 146 projecting therefrom and having valves 148 at the free ends thereof normally closing nozzles 150 in drum 130. A rod 144 is coupled to rod 152 in the drum 132, as at 154, and likewise includes outwardly projecting arms 156 having valves 158 on the free ends thereof normally closing nozzles 160 leading from the drum 132.

When the rods 144 and 152 are coupled together, as at 154, and different liquids are introduced into each of the drums 130 and 132 through the pipes 140 and 142, different liquids are simultaneously dispensed from the nozzles 150 and 160 into the mold cavities 122.

Obviously, when it is desired to only utilize drum 130 or 132, the shaft 144 may be uncoupled from the shaft 152 or supply to supply drum 132 may simply shut off, or vice versa. In any event, the operation is believed obvious in this modification to those skilled in the art, and it is likewise believed clear that this modification may be utilized with either of the actual valve operating structures utilizing the lever 78 and push-rod 80 of Figure 1 or the elongated diagonally extending lever 124' of Figure 7.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a dispensing apparatus, a frame having a pair of horizontal rails, each rail provided with horizontal flanges on which molds to be filled are adapted to slide and vertical flanges between which the molds are slidable whereby the molds as they move on said rails are constrained to travel in a straight, horizontal path, a conveyor for the molds, said conveyor including an endless flexible member, means at both ends of said rails around which said member is entrained, drive means for said flexible member located below said rails and drivingly connected with said flexible member, said flexible member having an upper flight located between said rails, spaced cleats connected to said flexible member and constituting a part of said conveyor, a supply reservoir located above said rails, a support for said reservoir secured to said frame holding said reservoir above said rails, multiple discharge valve controlled nozzles operatively connected with said reservoir and located above said rails, means for actuating the valves that control said nozzles, said valve actuating means including an endless member having a flight parallel to said upper flight of said conveyor, a cleat on said endless member adapted to be engaged by the mold to propel said endless member upon movement upon said molds as they pass over said rails, a valve actuating rod, and means driven by the last mentioned endless member for periodically actuating said valve actuating rod.

2. In a dispensing apparatus for filling mold voids in the manufacture of frozen confections, a frame having a pair of generally horizontal parallel rails, an endless conveyor having an upper flight located between said rails, cleats on said conveyor adapted to propel the molds along said rails, a liquid dispenser, a support holding said liquid dispenser above said rails on said frame, said dispenser including a container having a liquid inlet line, a plurality of openings, nozzles in said openings, said openings being at the lower part of said container, valves for each of said nozzles, a common valve operating rod mounted for rotation in said container and having a portion which projects through an opening in one wall of said container, means for rotating said valve operating rod in order to simultaneously actuate each of said valves, said means including an endless member, a tightener carried by seaid frame and operatively connected with said member, said endless member having a cleat which is actuated by the molds as they pass over said endless member in order to impart movement to said endless member, and means drivingly connecting said endless member and said valve operating rod for imparting rotary movement to the latter.

References Cited in the file of this patent
UNITED STATES PATENTS

| | | |
|---|---|---|
| 854,075 | Burpee | May 21, 1907 |
| 1,122,334 | Taylor | Dec. 29, 1914 |
| 1,795,312 | Mojonnier et al. | Mar. 10, 1931 |
| 2,262,662 | Ardon | Nov. 11, 1941 |